US008721213B2

(12) United States Patent
Johannsen et al.

(10) Patent No.: US 8,721,213 B2
(45) Date of Patent: *May 13, 2014

(54) SEAL ASSEMBLY FOR TRACK PIN JOINT ASSEMBLY

(75) Inventors: Eric J. Johannsen, Washington, IL (US); Roger L. Recker, Dunlap, IL (US); Jason L. Sebright, Chillicothe, IL (US); Mark J. Kiesel, Peoria, IL (US); Guanghui Liang, Dunlap, IL (US); Mark Diekevers, Metamora, IL (US)

(73) Assignee: Caterpillar Inc., Peoria, IL (US)

(*) Notice: Subject to any disclaimer, the term of this patent is extended or adjusted under 35 U.S.C. 154(b) by 147 days.

This patent is subject to a terminal disclaimer.

(21) Appl. No.: 13/076,294

(22) Filed: Mar. 30, 2011

(65) Prior Publication Data

US 2011/0243648 A1    Oct. 6, 2011

Related U.S. Application Data

(60) Provisional application No. 61/319,433, filed on Mar. 31, 2010.

(51) Int. Cl.
*F16G 11/00* (2006.01)
(52) U.S. Cl.
USPC ............................. 403/288; 277/84; 305/103
(58) Field of Classification Search
USPC .................. 403/288, 151; 277/377, 380–383; 305/100, 102–106
See application file for complete search history.

(56) References Cited

U.S. PATENT DOCUMENTS

| 3,390,922 | A | * | 7/1968 | Reinsma ..................... 305/103 |
| 4,029,366 | A | | 6/1977 | Baylor |
| 4,087,100 | A | | 5/1978 | Yoshihashi et al. |
| 4,094,516 | A | | 6/1978 | Morley et al. |
| 4,132,418 | A | * | 1/1979 | Roli ........................... 277/382 |
| 4,195,852 | A | * | 4/1980 | Roley et al. ................. 277/380 |

(Continued)

FOREIGN PATENT DOCUMENTS

WO    WO 2008/093160 A1    8/2008

OTHER PUBLICATIONS

U.S. Appl. No. 13/076,191, filed Mar. 30, 2011, Johannsen et al.

(Continued)

*Primary Examiner* — Michael P Ferguson
*Assistant Examiner* — Daniel Wiley
(74) *Attorney, Agent, or Firm* — Leydig, Voit & Mayer

(57) ABSTRACT

A seal assembly can be incorporated into a track pin joint assembly including a pin defining a longitudinal axis, a first member and a second member both coaxial with the pin about the longitudinal axis. The first member is pivotable about the longitudinal axis with respect to the second member and includes a load ring engagement surface defining a seal cavity disposed in proximal relationship to the second member. A seal assembly including a seal ring and a load ring is disposed in the seal cavity and sealingly engages the first and second members. An axial segment of a seal ring engagement surface of the load ring extends over at least half the length, measured along the longitudinal axis, between a radial segment of the seal ring engagement surface and a radial segment of a first member engagement surface of the load ring. At least one of a load ring engagement surface of the first member and an axial segment of the first member engagement surface of the load ring includes a convex rounded portion.

18 Claims, 5 Drawing Sheets

(56) References Cited

U.S. PATENT DOCUMENTS

| | | | |
|---|---|---|---|
| 4,262,914 A * | 4/1981 | Roley | 277/381 |
| 4,331,339 A * | 5/1982 | Reinsma | 305/103 |
| 4,457,521 A | 7/1984 | Morley | |
| 4,469,336 A | 9/1984 | Linne | |
| 4,819,999 A | 4/1989 | Livesay et al. | |
| 5,390,997 A * | 2/1995 | Nakaishi et al. | 305/103 |
| 5,542,701 A | 8/1996 | Rion | |
| 5,794,940 A | 8/1998 | Brueggmann | |
| 5,826,884 A | 10/1998 | Anderton et al. | |
| 5,899,459 A | 5/1999 | Watts | |
| 6,102,408 A | 8/2000 | Anderton et al. | |
| 6,105,969 A | 8/2000 | Anderton et al. | |
| 6,382,742 B1 | 5/2002 | Hasselbusch et al. | |
| 6,386,651 B1 | 5/2002 | Gerardin et al. | |
| 6,454,366 B1 | 9/2002 | Egle | |
| 6,478,388 B2 | 11/2002 | Maguire | |
| 6,739,680 B2 | 5/2004 | Hasselbusch et al. | |
| 7,296,800 B2 | 11/2007 | Tsuboi et al. | |
| 7,347,513 B2 | 3/2008 | Johannsen et al. | |
| 2002/0117075 A1 | 8/2002 | Maguire | |
| 2004/0032166 A1 | 2/2004 | Maguire et al. | |
| 2004/0036353 A1 | 2/2004 | Hasselbusch et al. | |
| 2004/0119245 A1 | 6/2004 | Thomas et al. | |
| 2005/0040708 A1 | 2/2005 | Yamamoto et al. | |
| 2005/0110219 A1 | 5/2005 | Tsuboi et al. | |
| 2006/0022411 A1 | 2/2006 | Beardsley et al. | |
| 2006/0049692 A1 | 3/2006 | Livesay et al. | |
| 2006/0158034 A1 | 7/2006 | Standish et al. | |
| 2006/0163217 A1 | 7/2006 | Jiang et al. | |
| 2006/0284485 A1 | 12/2006 | Johannsen et al. | |
| 2007/0267390 A1 | 11/2007 | Jiang et al. | |
| 2007/0267821 A1 | 11/2007 | Vom Stein et al. | |
| 2008/0102291 A1 | 5/2008 | Hattiangadi et al. | |
| 2008/0164756 A1 | 7/2008 | Yamamoto et al. | |
| 2008/0265667 A1 | 10/2008 | Livesay | |
| 2009/0102281 A1 | 4/2009 | Diekevers et al. | |
| 2009/0108541 A1 | 4/2009 | Beardsley et al. | |
| 2009/0110472 A1 | 4/2009 | Liang et al. | |
| 2009/0243384 A1 | 10/2009 | Diekevers et al. | |
| 2010/0052418 A1 | 3/2010 | Angot | |
| 2010/0133898 A1 | 6/2010 | Johannsen et al. | |
| 2010/0139993 A1 | 6/2010 | Sebright et al. | |
| 2010/0141027 A1 | 6/2010 | Fischer et al. | |
| 2010/0146925 A1 | 6/2010 | Johannsen et al. | |
| 2010/0148572 A1 | 6/2010 | Vom Stein | |
| 2010/0148575 A1 | 6/2010 | Johannsen et al. | |
| 2010/0154734 A1 | 6/2010 | Sebright et al. | |
| 2010/0156169 A1 | 6/2010 | Angot et al. | |
| 2011/0006597 A1 | 1/2011 | Diekevers et al. | |

OTHER PUBLICATIONS

"DSK Track-Type Tractor," Caterpillar product brochure; 2009; 16 pp.; Caterpillar Inc.; Peoria, IL, USA.
"D6R Series II Track-Type Tractor," Caterpillar product brochure; 2005; 24 pp.; Caterpillar Inc.; Peoria, IL, USA.
"D6R Series III Track-Type Tractor," Caterpillar product brochure; 2005; 20 pp.; Caterpillar Inc.; Peoria, IL, USA.
"A Complete Guide to Caterpillar Undercarriage Systems," Caterpillar product brochure; 2008; 4 pp.; Caterpillar Inc.; Peoria, IL, USA.
"Caterpillar Dozer Undercarriage & Excavator Undercarriage Systems," retrieved from URL:http://www.cat.com/cda/layout?m=40160&x=7&f=322205 on Feb. 1, 2011; 2 pp.; Caterpillar Inc.; Peoria, IL, USA.

* cited by examiner

SEAL ASSEMBLY FOR TRACK PIN JOINT ASSEMBLY

CROSS-REFERENCE TO RELATED APPLICATION

This patent application claims the benefit of priority to U.S. Provisional Patent Application No. 61/319,433, filed Mar. 31, 2010, and entitled "Track Seal and Track Seal Cavity," which is incorporated in its entirety herein by this reference.

TECHNICAL FIELD

This patent disclosure relates generally to an undercarriage for a track-type machine and, more particularly, to a seal assembly for use with a track pin joint assembly of the undercarriage.

BACKGROUND

Track-type machines are in widespread use in construction, mining, forestry, and other similar industries. The undercarriage of such track-type machines utilizes track assemblies, rather than wheels, to provide ground-engaging propulsion. Such track assemblies may be preferred in environments, such as the environments identified above, where creating sufficient traction is problematic. Specifically, rather than rolling across a work surface on wheels, track-type machines utilize one or more track assemblies that include an endless loop of coupled track links defining outer surfaces, which support ground-engaging track shoes, and inner surfaces that travel about one or more rotatable track-engaging elements, such as, for example, drive sprockets, idlers, tensioners, and rollers.

Track seals are disposed between the components of a track chain of a tracked undercarriage in order to seal the track chain against dirt, mud, and debris while retaining lubricants in the track chain. The failure of a seal within a track chain can accelerate wear and cause early failure of a portion of the track chain.

A common type of seal used in track chains is referred to as a "can" seal. A can seal often includes a "lip" supported by a can and a load ring engaging the can. The surface defining a seal cavity can interact with the load ring to apply a force to the can and the lip. The lip engages a sealing surface of an adjacent component. Together, the can seal, the surface defining the seal cavity, and the sealing surface of the adjacent component provide a sealed interface to retain lubricant within the assembly and protect against dirt, mud, abrasive materials, debris and other contaminants. Examples of such can seals are shown and described in U.S. Patent Application Publication No. US 2007/10267821; U.S. Pat. Nos. 5,794,940 and 4,094,516; and International Publication No. WO 2008/093160 A1.

One cause of failure of current can-type seals is known in the art as "heel under." Heel under describes the situation where debris is ingested between an outer surface of the load ring and the seal cavity. The debris builds up and can cause the load ring to rotate or move out of position against the can resulting in the failure of the can seal and leakage of lubricant.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a seal assembly adapted for use in sealing a joint having a first member pivotable about a rotational axis relative to a second member thereof. The first member includes a load ring engagement surface defining, at least in part, an axially-extending seal cavity about the rotational axis.

The seal assembly includes a seal ring and a load ring. The seal ring has an axial flange extending along the rotational axis and a radial flange extending along a radial axis perpendicular to the rotational axis.

The load ring includes a seal ring engagement surface and a first member engagement surface. The seal ring engagement surface includes a radial segment in proximate relationship with the radial flange of the seal ring and an axial segment in proximate relationship with the axial flange of the seal ring. The first member engagement surface is adapted to engage the load ring engagement surface of the first member. The first member engagement surface includes a radial segment and an axial segment. The radial segment of the first member engagement surface is in distal relationship with the radial segment of the seal ring engagement surface. The axial segment of the first member engagement surface includes a convex rounded portion. The axial segment of the seal ring engagement surface of the load ring extends over at least half the length, measured along the rotational axis, between the radial segment of the seal ring engagement surface and the radial segment of the first member engagement surface.

In another embodiment, a track pin joint assembly is disclosed that includes a pin, a first member, a second member, and a seal assembly. The pin defines a longitudinal axis. The first member and second member are both coaxial with the pin about the longitudinal axis. The first member is pivotable about the longitudinal axis with respect to the second member. The first member includes an end and a load ring engagement surface defining, at least in part, an axially-extending seal cavity disposed in proximal relationship to the second member. The seal assembly is disposed in the seal cavity and sealingly engages the first member and the second member.

The seal assembly includes a seal ring and a load ring. The seal ring has an axial flange extending along the longitudinal axis and a radial flange portion extending along a radial axis perpendicular to the longitudinal axis.

The load ring includes a seal ring engagement surface and a first member engagement surface. The seal ring engagement surface includes a radial segment in proximate relationship with the radial flange of the seal ring and an axial segment in proximate relationship with the axial flange of the seal ring. The first member engagement surface engages the load ring engagement surface of the first member. The first member engagement surface includes a radial segment and an axial segment. The radial segment of the first member engagement surface is in distal relationship with the radial segment of the seal ring engagement surface. The axial segment of the seal ring engagement surface of the load ring extends over at least half the length, measured along the longitudinal axis, between the radial segment of the seal ring engagement surface and the radial segment of the first member engagement surface. At least one of the load ring engagement surface of the first member and the axial segment of the first member engagement surface of the load ring includes a convex rounded portion.

Further and alternative aspects and features of the disclosed principles will be appreciated from the following detailed description and the accompanying drawings. As will be appreciated, the principles related to track seal assemblies disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

The present disclosure provides a seal assembly for a track chain pin joint assembly of an undercarriage of a track-type machine. Examples of such machines include machines used for construction, mining, forestry, and other similar industries. In some embodiments, the machine can be a dozer, loader, or excavator, or any other on-highway or off-highway vehicle having a track-type undercarriage having first and second track assemblies on opposing sides thereof. The track assemblies can be adapted to engage the ground, or other surface, to propel the track-type machine.

Figure 1:
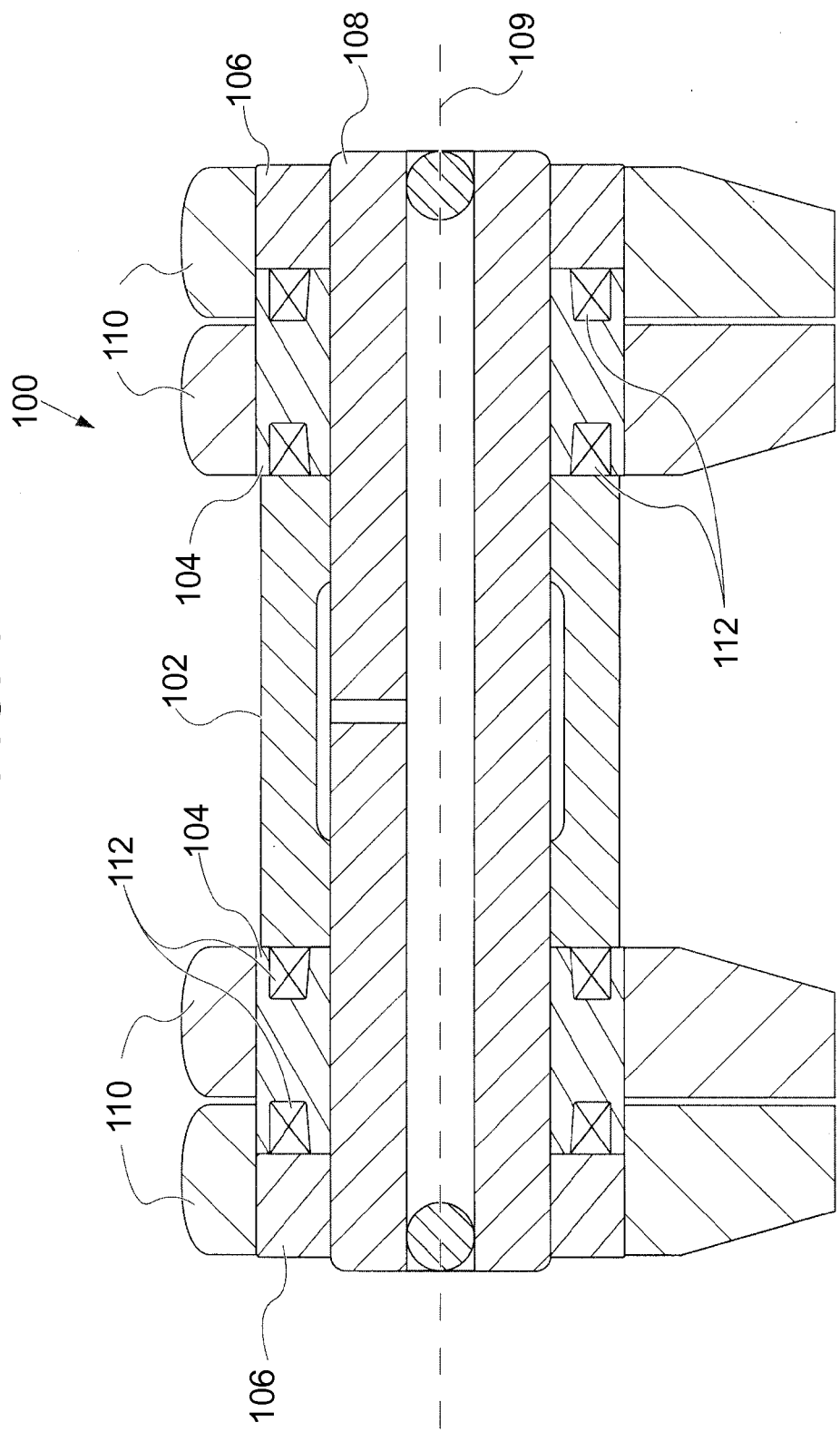
FIG. 1 is a cross-sectional view of an embodiment of a track chain suitable for use with an embodiment of a seal assembly constructed in accordance with principles of the present disclosure, the track chain including a bushing, a track pin, track links, seals, and seal cavities.

Turning now to the Figures, there is shown in FIG. 1 an exemplary embodiment of a track pin joint assembly 100 of a track chain that can be used as part of a tracked undercarriage of a track-type tractor, tracked loader, or any other tracked machine known in the art. As shown, the illustrated portion of the track pin joint assembly 100 includes a bushing 102, a pair of inserts 104, and a pair of outer end collars 106 disposed over a track pin 108 defining a longitudinal axis 109. A plurality of track links 110 are disposed over the inserts 104 and the collars 106 around the track pin 108.

As is well known in the art, the components of the track pin joint assembly 100 can define a plurality of annular seal cavities 112 that extend around the track pin 108 and are each adapted for housing therein a seal assembly suitable for sealingly engaging rotating components of the track pin joint assembly 100. For purposes of illustration, the left-side insert 104 can be considered a first member, and the bushing 102 can be considered a second member. The first member 104 and the second member 102 are both coaxial with the pin 108 about the longitudinal axis 109. The first member 104 is pivotable with respect to the second member 102 about a rotational axis that coincides with the longitudinal axis 109 of the track pin 108. The first member 104 includes an end and a load ring engagement surface defining, at least in part, an axially-extending seal cavity 112 disposed in proximal relationship to the second member 102. A seal assembly constructed in accordance with principles of the present disclosure can be disposed within the seal cavity 112 to sealingly engage the first member 104 and the second member 102 while allowing relative rotation therebetween.

It should be understood by one skilled in the art that other pairs of first and second members (such as the relative movement between the outer end collars 106 and the adjacent inserts 104 and/or the right-side insert 104 and the bushing 102) are present in the track pin joint assembly 100 which can be similarly equipped with a seal assembly constructed in accordance with principles of the present disclosure. Each seal assembly can be adapted to sealingly engage both the first and the second members. In other embodiments of a track pin joint assembly, other components (such as, the bushing 102, the collars 106, and the track links 110, for example) can define suitable seal cavities, and other seal cavity locations within the components of the track pin joint assembly can be used. In other embodiments, the track pin joint assembly can be provided as part of a track pin cartridge.

Figure 2:
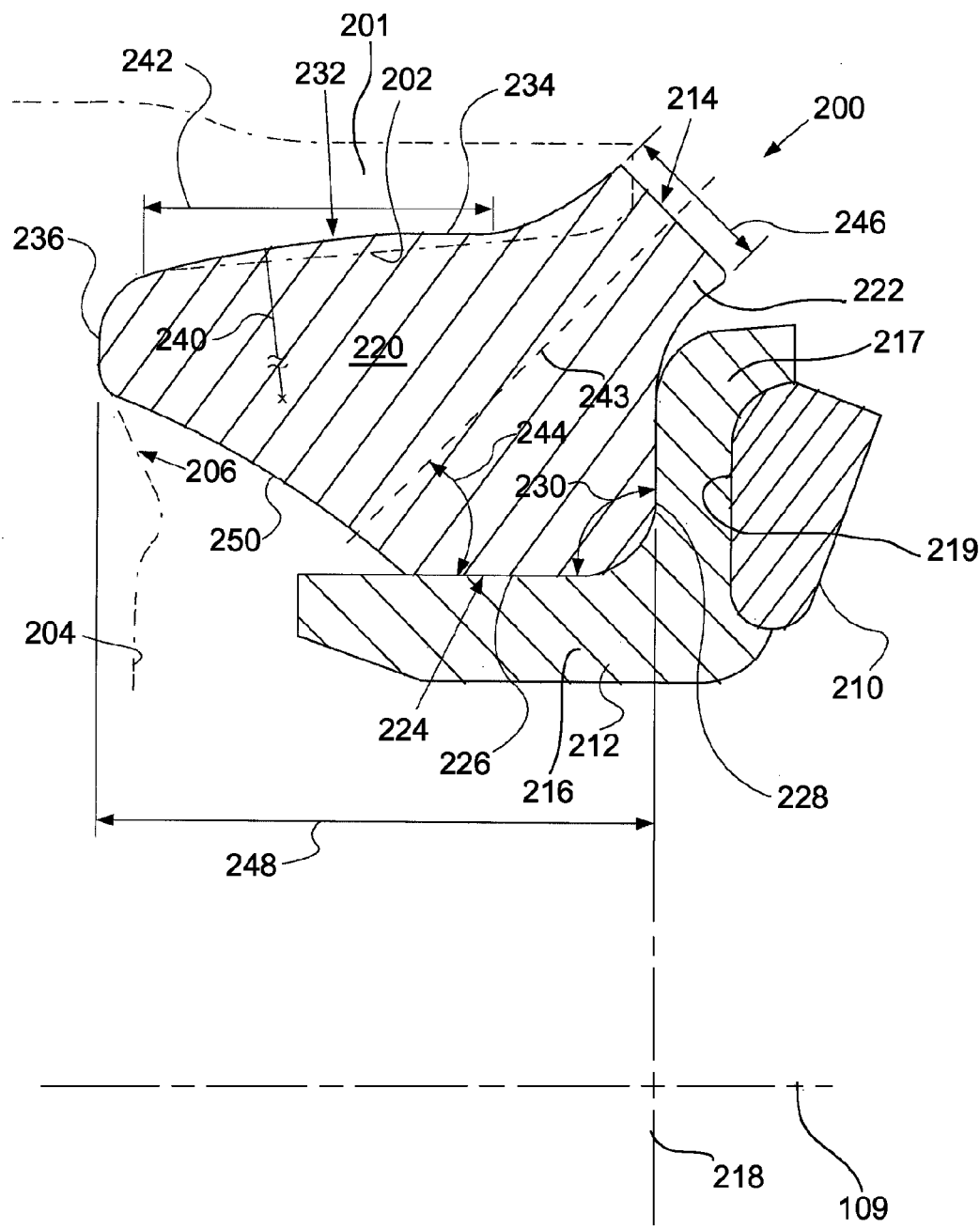
FIG. 2 is a cross-sectional view of an embodiment of a seal assembly constructed in accordance with principles of the present disclosure, the seal assembly shown in an uninstalled state in comparison to surfaces of a seal cavity of a first member shown in phantom lines.

Referring to FIG. 2, an embodiment of a seal assembly 200 constructed in accordance with principles of the present disclosure is shown. The seal assembly 200 is shown in an uninstalled state wherein the components are not compressed. The seal assembly 200 is adapted for use in sealing a track pin joint having a first member 201 pivotable about a rotational axis, such as the longitudinal axis 109 of the track pin 108, relative to a second member thereof.

The first member 201 includes a load ring engagement surface 202 and a base surface 204 defining, at least in part, an axially-extending seal cavity 206 about the rotational axis. The load ring engagement surface 202 of FIG. 2 has a generally straight profile. An inner surface (shown in FIG. 1) of the first member that also defines the seal cavity 206 can be integrally formed with the load ring engagement surface 202 and the base surface 204. In other embodiments, the base surface can be defined by a separate thrust ring (not shown).

The seal assembly 200 includes a sealing lip 210, a can or seal ring 212, and a load ring 214. The sealing lip 210 can be made from any suitable material, such as, plastic, for example. The seal ring 212 can be made from any suitable material, such as metal, for example. The load ring 214 can be made from any suitable material, such as an elastomeric material, for example. In other embodiments, the sealing lip 210, the seal ring 212, and the load ring 214 can each be made from other materials without altering the functional aspects of the design.

The sealing lip 210 is in the form of an annulus. The sealing lip 210 extends axially from the sealing ring 212. The sealing lip 210 is adapted to sealingly engage one of the members of the track pin joint assembly which is movable with respect to another member thereof.

The seal ring 212 is in the form of an annulus. The seal ring 212 has an axial flange 216, extending along the rotational axis 109, and a radial flange 217, extending along a radial axis 218 perpendicular to the rotational axis 109.

In some embodiments, the lip 210 is separately formed and then attached to the seal ring 212. In the illustrated embodiment, the radial flange 217 defines a concave groove 219 adapted to receive the sealing lip 210 therein. In other embodiments, the seal ring 212 and the sealing lip 210 can be integrally formed as a unitary structure. The seal ring 212 can be made from a rigid material and receive a constant force from the load ring 214 when installed and under compression. The force from the load ring 214 is transferred from the seal ring 212 to the sealing lip 210 as a sealing force against the second member.

The load ring 214 is in the form of an annulus. The load ring 214 includes a main body 220 and a neck 222 extending from the main body 220. The main body 220 of the load ring 214 includes a seal ring engagement surface 224, a first member engagement surface 232, and a relief surface 250.

The seal ring engagement surface 224 includes an axial segment 226 in proximate relationship with the axial flange 216 of the seal ring 212 and a radial segment 228 in proximate relationship with the radial flange 217 of the seal ring 212. In some embodiments and as shown, the axial segment 226 may extend in substantially parallel relationship to the longitudinal axis 109 of the track pin 108 with the radial segment 228 extending at an angle 230 to the axial segment 226. The angle 230 may range from twenty degrees to one hundred sixty degrees. As shown, the radial segment 228 and the axial segment 226 of the seal ring engagement surface 224 of the load ring 212 are disposed in substantially perpendicular relationship with respect to each other. The radial segment 228 is substantially perpendicular to the longitudinal axis 109.

The first member engagement surface 232 is disposed opposite the seal ring engagement surface 224 and includes an axial segment 234 and a radial segment 236. The first member engagement surface 232 is adapted to engage the load ring engagement surface 202 of the first member 201.

The radial segment 236 is shaped to engage a portion of the base surface 204 in the seal cavity 206. The radial segment 236 of the first member engagement surface 232 is in distal relationship with the radial segment 228 of the seal ring engagement surface 224. In some embodiments and as shown, the radial segment 236 of the first member engagement surface 232 has a rounded convex shape. In other embodiments, the radial segment 236 of the first member engagement surface 232 can include a straight portion.

As shown, the axial segment 234 of the first member engagement surface 232 includes a convex rounded portion extending over at least half the length 242, measured along the rotational axis 109, of the axial segment 234 of the first member engagement surface 232. The convex rounded portion of the first member engagement surface 232 of the load ring 214 has a cross-sectional shape with a radius 240 in a range from about one to about six times the length 242 of the axial segment 234 of the first member engagement surface 232. Even more preferably, in some embodiments, the radius 240 may be in a range from about three to about four times the length 242 of the axial segment 234.

The neck 222 is disposed between the axial segment 234 of the first member engagement surface 232 and the radial segment 228 of the seal ring engagement surface 224. The neck 222 extends along a neck axis 243 disposed in oblique relationship with the axial segment 226 of the seal ring engagement surface 224. In the uninstalled, uncompressed state, the neck 222 extends from the main body 220 along the neck axis 243 at a neck angle 244, with respect to the axial segment 226 of the seal ring engagement surface 224, in a range from about twenty degrees to about seventy degrees. More preferably, in some embodiments, the neck angle 244 is in a range from about thirty degrees to about sixty degrees when the neck 222 is in an uncompressed state.

The neck 222 has a neck thickness 246, measured in a direction perpendicular to the neck axis 243. The neck thickness 246 can be sized such that when the seal assembly 200 is installed in the seal cavity 206, the neck 222 is compressed between the seal ring 212 and the load ring engagement surface 202 of the first member 201. In some embodiments, the neck thickness 246 can be in a range from about one-eighth to about one-half the distance 248, measured along the rotational axis 109, between the radial segment 228 of the seal ring engagement surface 224 and the radial segment 236 of the first member engagement surface 232 when in an uninstalled state, wherein the load ring 214 is uncompressed. Even more preferably, in other embodiments, the neck thickness 246 can be in a range from about one-quarter to about one-half the distance 248 between the radial segment 228 of the seal ring engagement surface 224 and the radial segment 236 of the first member engagement surface 232 when in an uninstalled state.

The relief surface 250 extends between the radial segment 236 of the first member engagement surface 232 and the axial segment 226 of the seal ring engagement surface 224. The illustrated relief surface 250 is in the form of a concave curved surface.

Figure 3:
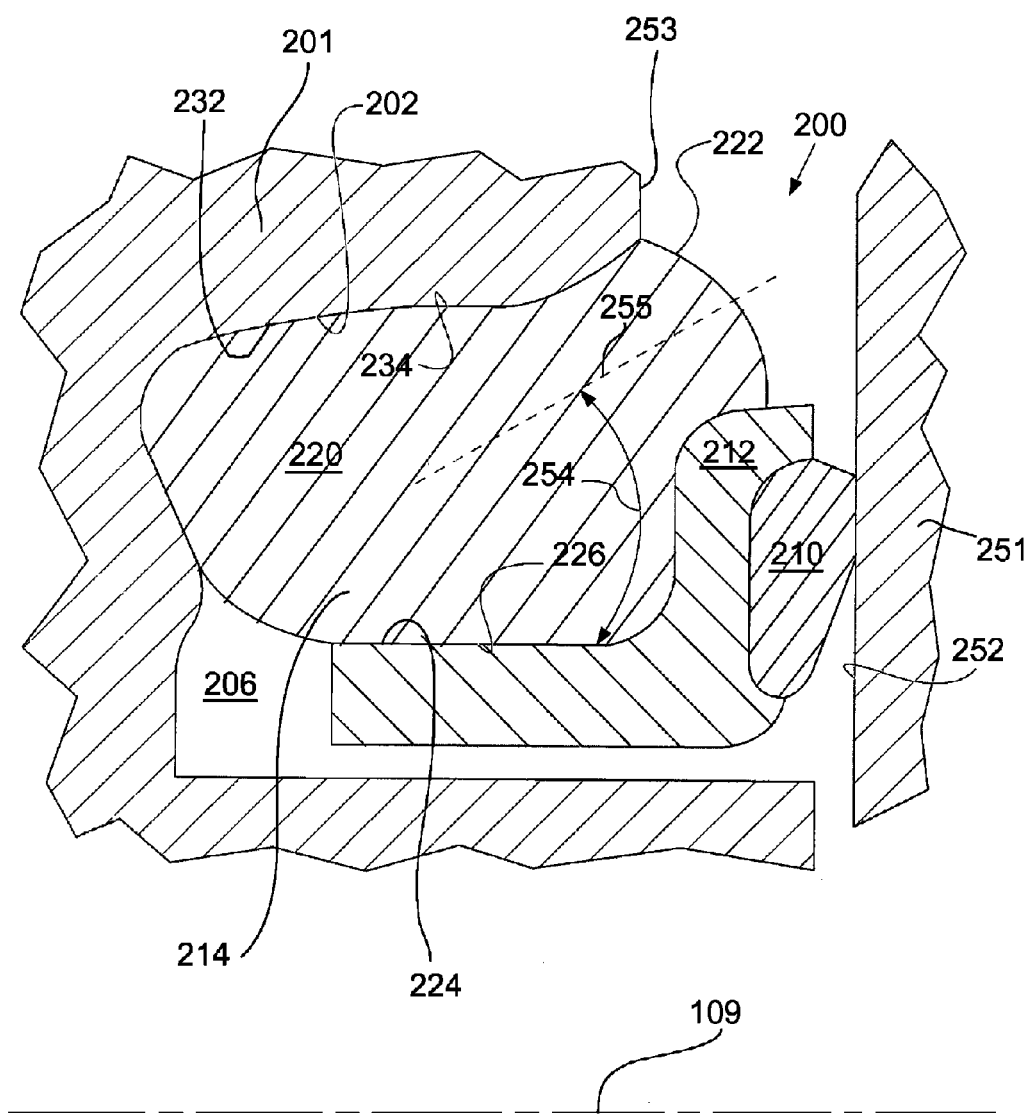
FIG. 3 is a cross-sectional view of the seal assembly of FIG. 2 shown installed in the seal cavity of the first member of FIG. 2.

Referring to FIG. 3, the seal assembly 200 is installed in the seal cavity 206. The first member 201 and a second member 251 are both coaxial with the track pin 108 about the longitudinal axis 109. The first member 201 is pivotable about the longitudinal axis 109 with respect to the second member 251. The second member 251 includes a sealing surface 252 in sealing engagement with the sealing lip 210 of the seal assembly 200. The first member 201 includes an end 253 and the load ring engagement surface 202 which defines, at least in part, the axially-extending seal cavity 206. The seal cavity 206 is disposed in proximal relationship to the second member 251. At least one of the load ring engagement surface 202 of the first member 201 and the axial segment 234 of the first member engagement surface 232 of the load ring 214 includes a convex rounded portion extending over at least half the axial length thereof.

The load ring 214 acts as a gasket and sealingly engages the first member 201 and the seal ring 212. The first member engagement surface 232 of the load ring 214 engages the load ring engagement surface 202 of the first member 201. As shown, the load ring 214 is placed in compression and the compression of the load ring 214 provides the sealing force to the sealing lip 210 against the sealing surface 252 of the second member 251. The load ring 214 acts in the manner of a spring to apply an axial load against the seal ring 212 along the longitudinal axis 109 to bring the sealing lip 210 mounted to the seal ring 212 into sealing contact with the sealing surface 252 of the second member 251 such that a running fluid-tight seal is formed therebetween.

The load ring 214 is compressed. The axial segment 234 of the first member engagement surface 232 conforms to the load ring engagement surface 202 of the first member 201. The neck 222 is deflected by the load ring engagement surface 202 of the first member 201 and compressed between the seal ring 212 and the load ring engagement surface 202.

The neck 222 of the load ring 214 extends from the main body 220 along a neck axis 255 disposed at a second neck angle 254 with respect to the axial segment 226 of the seal ring engagement surface 224 in an installed state, wherein the load ring 214 is compressed between the first member 201 and the seal ring 212. The first neck angle 244, shown in FIG. 2, is different than the second neck angle 254, shown in FIG. 3. In some embodiments, the difference between the first neck angle 244 and the second neck angle 254 is in a range from about three degrees to about sixty degrees. In other embodiments, the difference between the first neck angle 244 and the second neck angle 254 is in a range from about ten degrees to about fifty degrees. In still other embodiments, the difference between the first neck angle 244 and the second neck angle 254 is in a range from about thirty degrees to about forty degrees.

Figure 4:
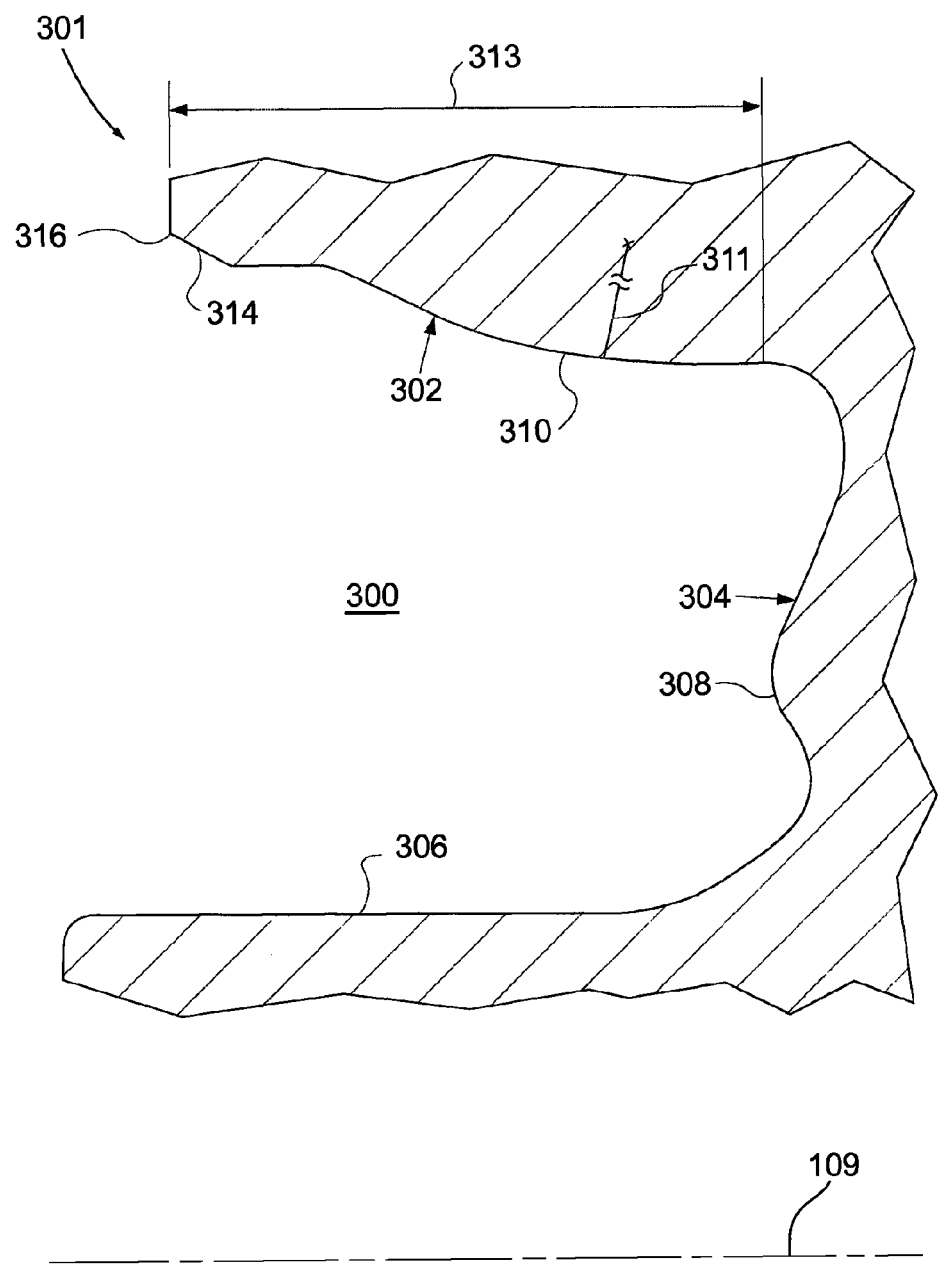
FIG. 4 is a cross-sectional view of another embodiment of a first member having surfaces that define another seal cavity.

Referring to FIG. 4, another embodiment of a member 301 of a track pin joint assembly is shown. The member 301 defines a seal cavity 300 adapted for use in housing a seal assembly constructed in accordance with the present principles.

The member 301 includes a load ring engagement surface 302, an annular base surface 304 extending substantially radially about the longitudinal axis 109, and an inner cylindrical surface 306. The load ring engagement surface 302, the base surface 304, and the inner cylindrical surface 306 cooperate together to define the seal cavity 300.

The base surface 304 can include a bump 308 that extends axially toward an end 316 of the first member 301. The bump 308 can help prevent heel under by being adapted to engagingly support the radial segment 236 of the first member engagement surface 232 of the load ring 212.

The load ring engagement surface 302 can include a chamfer 314 at the end 316 to facilitate installation of a seal assembly in the seal cavity 300. The load ring engagement surface 302 extends between the end 316 of the first member 301 and the base surface 304. The load ring engagement surface 302 includes a convex rounded portion 310 extending over at least half the length 313 of the load ring engagement surface 302, wherein the length 313 is measured along the longitudinal axis 109 between the end 316 and the base surface 304 of the member 301. The convex rounded portion 310 of the load ring engagement surface 302 of the member 301 has a cross-sectional shape with a radius 311 in a range from about one-quarter to about eight times the axial length 313 of the load ring engagement surface 302. In other embodiments, the radius 311 is in a range from about one to about four times the length 313 of the load ring engagement surface 302.

Figure 5:
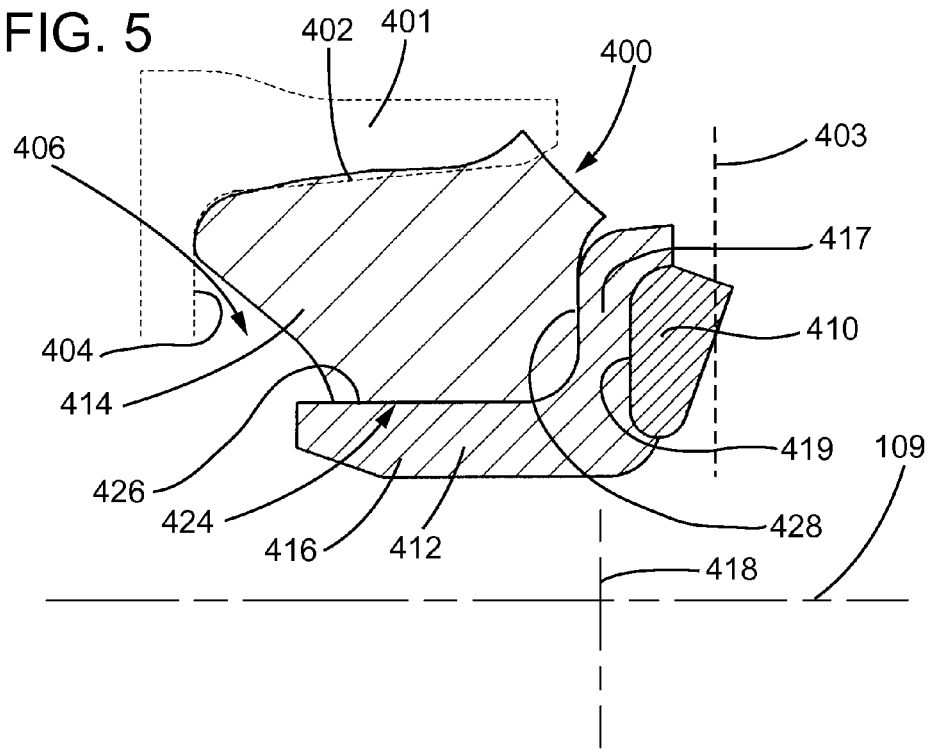
FIG. 5 is a cross-sectional view of another embodiment of a seal assembly constructed in accordance with principles of the present disclosure, the seal assembly shown in an uninstalled state in comparison to surfaces of a seal cavity of a first member and a sealing surface of a second member shown in phantom lines.

Referring to FIG. 5, another embodiment of a seal assembly 400 constructed in accordance with principles of the present disclosure is shown. The seal assembly 400 is shown in an uninstalled state wherein the components are not compressed. The seal assembly 400 is adapted for use in sealing a track pin joint having a first member 401 pivotable about a rotational axis, such as the longitudinal axis 109 of the track pin 108, relative to a second member 403 thereof.

The first member 401 includes a load ring engagement surface 402 and a base surface 404 defining, at least in part, an axially-extending seal cavity 406 about the rotational axis 109. The load ring engagement surface 402 of FIG. 4 has a generally straight profile. In other embodiments, the load ring engagement surface 402 can include a convex rounded portion such that at least one of the load ring engagement surface 402 of the first member 401 and an axial segment 434 of a first member engagement surface 432 of a load ring 412 includes a convex rounded portion.

An inner surface (shown in FIG. 1) of the first member that also defines the seal cavity 406 can be integrally formed with the load ring engagement surface 402 and the base surface 404 or can be provided by an insert sleeve component. In other embodiments, the base surface 404 can be defined by a separate thrust ring (not shown).

The seal assembly 400 includes a sealing lip 410, a can or seal ring 412, and a load ring 414. The sealing lip 410, the seal ring 412, and the load ring 414 are all in the form of an annulus.

The sealing lip 410 extends axially from the sealing ring 412. The sealing lip 410 is adapted to sealingly engage the second member 403 of the track pin joint assembly which is rotationally movable with respect to the first member 401 thereof.

The seal ring 412 has an axial flange 416, extending along the rotational axis 109, and a radial flange 417, extending along a radial axis 418 perpendicular to the rotational axis 109. In the illustrated embodiment, the radial flange 417 defines a concave groove 419 adapted to receive the sealing lip 410 therein. In other embodiments, the seal ring 412 and the sealing lip 410 can be integrally formed as a unitary structure. The seal ring 412 can be made from a rigid material and transmit force from the load ring 414 when installed and under compression. The force from the load ring 414 is transferred from the seal ring 412 to the sealing lip 410 as a sealing force against the second member 403.

Figure 6:
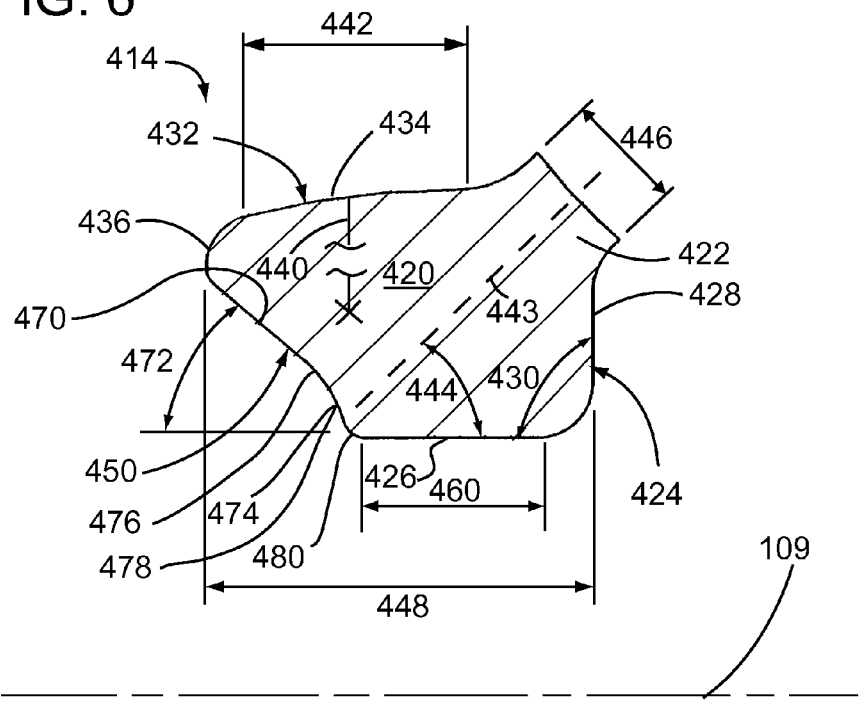
FIG. 6 is a cross-sectional view of the load ring of the seal assembly of FIG. 5.

Referring to FIG. 6, the load ring 414 includes a main body 420 and a neck 422 extending from the main body 420. The main body 420 of the load ring 414 includes a seal ring engagement surface 424, a first member engagement surface 432, and a relief surface 450.

Referring to FIGS. 5 and 6, the seal ring engagement surface 424 includes an axial segment 426 in proximate relationship with the axial flange 416 of the seal ring 412 and a radial segment 428 in proximate relationship with the radial flange 417 of the seal ring 412. In some embodiments and as shown, the axial segment 426 may extend in substantially parallel relationship to the longitudinal axis 109 of the track pin 108 with the radial segment 428 extending at an angle 430 to the axial segment 426. The angle 430 may range from twenty degrees to one hundred sixty degrees. As shown, the radial segment 428 and the axial segment 426 of the seal ring engagement surface 424 of the load ring 412 are disposed in substantially perpendicular relationship with respect to each other. The radial segment 428 is substantially perpendicular to the longitudinal axis 109.

The first member engagement surface 432 is disposed opposite the seal ring engagement surface 424 and includes an axial segment 434 and a radial segment 436. The first member engagement surface 432 is adapted to engage the load ring engagement surface 402 of the first member 401 (see FIG. 5).

The radial segment 436 is shaped to engage a portion of the base surface 404 in the seal cavity 406 (see FIG. 5). The radial segment 436 of the first member engagement surface 432 is in distal relationship with the radial segment 428 of the seal ring engagement surface 424. The radial segment 436 of the first member engagement surface 432 has a rounded convex shape. In other embodiments, the radial segment 436 of the first member engagement surface 432 can include a straight portion.

The axial segment 434 of the first member engagement surface 432 includes a convex rounded portion extending over at least half the length 442, measured along the rotational axis 109, of the axial segment 434 of the first member engagement surface 432. The convex rounded portion of the first member engagement surface 432 of the load ring 414 has a cross-sectional shape with a radius 440 in a range from about one to about six times the length 442 of the axial segment 434 of the first member engagement surface 432. Even more preferably, in some embodiments, the radius 440 may be in a range from about three to about four times the length 442 of the axial segment 434. In the illustrated embodiment, the radius 440 is about three to about 3.9 times the length 442 of the axial segment 434.

The axial segment 426 of the seal ring engagement surface 424 of the load ring 412 has a length 460 that extends a distance measured along the rotational axis 109 that is over at least half the length 448 between the radial segment 428 of the seal ring engagement surface 424 and the radial segment 436 of the first member engagement surface 432. The length 460 of the illustrated axial segment 426 of the seal ring engagement surface 424 is about sixty percent of the length 448 between the radial segment 428 of the seal ring engagement surface 424 and the radial segment 436 of the first member engagement surface 432.

The axial length 460, measured along the rotational axis 109, of the axial segment 426 of the seal ring engagement surface 424 is equal to at least seventy-five percent of the axial length 442 of the axial segment 434 of the first member engagement surface 432. In other embodiments, the axial length 460 of the axial segment 426 of the seal ring engagement surface 424 is equal to at least ninety percent of the axial length 442 of the axial segment 434 of the first member engagement surface 432. In yet other embodiments, the axial length 460 of the axial segment 426 of the seal ring engagement surface 424 is in a range from about least seventy-five percent of the axial length 442 of the axial segment 434 of the first member engagement surface 432 to about one hundred twenty-five percent the axial length 442 of the axial segment 434 of the first member engagement surface 432.

The neck 422 is disposed between the axial segment 434 of the first member engagement surface 432 and the radial segment 428 of the seal ring engagement surface 424. The neck 422 extends along a neck axis 443 disposed in oblique relationship with the axial segment 426 of the seal ring engagement surface 424. In the uninstalled, uncompressed state, the neck 422 extends from the main body 420 along the neck axis 443 at a neck angle 444, with respect to the axial segment 426 of the seal ring engagement surface 424, in a range from about twenty degrees to about seventy degrees. More preferably, in some embodiments, the neck angle 444 is in a range from about thirty degrees to about sixty degrees when the neck 422 is in an uncompressed state.

The neck 422 of the load ring 414 extends from the main body 420 along a neck axis disposed at a second neck angle with respect to the axial segment 426 of the seal ring engagement surface 424 in an installed state, wherein the load ring 414 is compressed between the first member 401 and the seal ring 412. The first neck angle 444, shown in FIG. 6, is different than the second neck angle. In some embodiments, the difference between the first neck angle 444 and the second neck angle is in a range from about three degrees to about sixty degrees. In other embodiments, the difference between the first neck angle 444 and the second neck angle is in a range from about ten degrees to about fifty degrees. In still other embodiments, the difference between the first neck angle 444 and the second neck angle is in a range from about thirty degrees to about forty degrees.

The neck 422 has a neck thickness 446, measured in a direction perpendicular to the neck axis 443. The neck thickness 446 can be sized such that when the seal assembly 400 is installed in the seal cavity 406, the neck 422 is compressed between the seal ring 412 and the load ring engagement surface 402 of the first member 401. In some embodiments, the neck thickness 446 can be in a range from about one-eighth to about one-half the distance 448, measured along the rotational axis 109, between the radial segment 428 of the seal ring engagement surface 424 and the radial segment 436 of the first member engagement surface 432 when in an uninstalled state, wherein the load ring 414 is uncompressed. Even more preferably, in other embodiments, the neck thickness 446 can be in a range from about one-quarter to about one-half the distance 448 between the radial segment 428 of the seal ring engagement surface 424 and the radial segment 436 of the first member engagement surface 432 when in an uninstalled state.

The neck 422 includes an outer relief surface 449 that is in substantially opposing relationship with the relief surface 450. The outer relief surface 449 is in the form of a concave curved surface.

The relief surface 450 extends between the radial segment 436 of the first member engagement surface 432 and the axial segment 426 of the seal ring engagement surface 424. The illustrated relief surface 450 includes an inclined segment 470 which is disposed at an oblique angle 472 with respect to the axial segment 426 of the seal ring engagement surface 424 and the rotational axis 109. The inclined segment 470 of the inner relief surface 450 is adjacent the radial segment 436 of the first member engagement surface 432. The angle 472 of the inclined segment 470 of the relief surface 450 with respect to the axial segment 426 of the seal ring engagement surface 424 is in a range from about twenty degrees to about sixty degrees. The illustrated angle 470 between the inclined segment 470 of the relief surface 450 and the axial segment 426 of the seal ring engagement surface 424 is about forty degrees.

The relief surface 450 includes a reverse curve portion 474 adjacent the axial segment 426 of the seal ring engagement surface 424. The reverse curve portion 474 of the relief surface 450 includes a concave segment 476, a transition segment 478, and a convex segment 480. The concave segment 476 is disposed adjacent the inclined segment 470 of the relief surface 450. The convex segment 480 is disposed adjacent the axial segment 426 of the seal ring engagement surface 424. The transition segment 478 is disposed between the concave segment 476 and the convex segment 480.

The seal assembly 400 of FIG. 5 can be similar in other respect to the seal assembly 200 of FIG. 2. In other embodiments, the seal assembly 400 of FIG. 5 can be used with the member 301 of FIG. 4, and the rounded convex portion of the first member engagement surface 432 of the load ring 412 can be omitted.

INDUSTRIAL APPLICABILITY

The industrial applicability of the embodiments of a track pin joint and a track seal assembly described herein will be readily appreciated from the foregoing discussion. At least one embodiment of the disclosed seal assemblies may be used for a track pin joint assembly. At least one embodiment of the disclosed track pin joint assemblies can be used in an undercarriage of a track-type machine.

An exemplary embodiment discloses a seal assembly for sealing between a first member 106 and a second member 104 of a joint, the first member 106 being able to pivot about an axis 109 of the joint relative to the second member 104. The first member 106 and the second member 104 may be parts of two links 110 of a track joint.

In general, a seal assembly has been disclosed that can help resist the ingestion of mud and debris and thus help inhibit the occurrence of heel under failures of a can seal. During use, the load ring and/or the load ring engagement surface of a member of the track pin joint according to principles of the present disclosure may provide one or more of the following benefits. First, the deflected and compressed neck of the load ring may provide a high sealing force between the neck and the load ring engagement surface of the member of the track pin joint to resist the ingestion of mud, dirt, debris, and water between the load ring and the member. Further, the rounded convex surface of the axial segment of the first member engagement surface of the load ring when compressed may provide an improved distribution of compressive strain throughout the load ring. Alternatively, this compression may be attained with a straight axial segment of a load ring by using a member of the track pin joint having a rounded convex load ring engagement surface to define the seal cavity. The rounded convex load ring engagement surface of the member that defines the seal cavity and/or the rounded convex axial segment of the first member engagement surface of the load ring, as well as the neck may be applied to known track pin joint components to help inhibit the ingestion of mud and debris between the load ring and the seal cavity.

Embodiments of a seal assembly and a track pin joint assembly according to principles of the present disclosure may find potential application in any machine, such as a track-type tractor, which utilizes a track-type undercarriage. Yet further, the present disclosure may be applicable to track assemblies in which the components are subject to significant wear. Such machines may include, but are not limited to, dozers, loaders, excavators, or any other on-highway or off-highway vehicles or stationary machines that utilize a track assembly, as described herein.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A seal assembly adapted for use in sealing a joint having a first member pivotable about a rotational axis relative to a second member thereof, the first member including a load ring engagement surface defining, at least in part, an axially-extending seal cavity about the rotational axis, the seal assembly comprising:
    a seal ring, the seal ring having an axial flange, extending parallel to the rotational axis, and a radial flange, extending along a radial axis perpendicular to the rotational axis; and
    a load ring, the load ring including a main body comprising a seal ring engagement surface and a first member engagement surface, and a neck extending outwardly from the main body along a neck axis;
    the seal ring engagement surface including a radial segment in proximate relationship with the radial flange of the seal ring and an axial segment in proximate relationship with the axial flange of the seal ring,
    the first member engagement surface adapted to engage the load ring engagement surface of the first member, the first member engagement surface including a radial segment and an axial segment, the radial segment of the first member engagement surface being in distal relationship with the radial segment of the seal ring engagement surface, and
    the neck axis disposed at an angle with respect to the axial segment of the seal ring engagement surface, and passing between the axial segment of the first member engagement surface and the radial segment of the seal ring engagement surface;
    wherein when the load ring is in an uninstalled state, such that the load ring is uncompressed:
    the axial segment of the first member engagement surface includes a convex rounded portion extending over at least half the length, measured along the rotational axis, of the axial segment of the first member engagement surface, and
    the axial segment of the seal ring engagement surface of the load ring extends over at least half the length, measured along the rotational axis, between the radial segment of the seal ring engagement surface and the radial segment of the first member engagement surface.

2. The seal assembly of claim 1, wherein the angle of the neck axis is in a range from about twenty degrees to about seventy degrees.

3. The seal assembly of claim 2, wherein the neck has a thickness, measured in a direction perpendicular to the neck axis, in a range from about one-eighth to about one-half the distance, measured along the rotational axis, between the radial segment of the seal ring engagement surface and the radial segment of the first member engagement surface when in an uninstalled state, wherein the load ring is uncompressed.

4. The seal assembly of claim 1, wherein the convex rounded portion of the first member engagement surface of the load ring has a cross-sectional shape with a radius in a range from about one to about six times the length of the axial segment of the first member engagement surface when the load ring is in an uninstalled state, wherein the load ring is uncompressed.

5. The seal assembly of claim 1, further comprising:
    a sealing lip, the sealing lip extending axially from the radial flange of the seal ring and adapted to sealingly engage the second member.

6. The seal assembly of claim 1, wherein the radial segment and the axial segment of the seal ring engagement surface of the load ring are disposed in substantially perpendicular relationship with respect to each other when the load ring is in an uninstalled state, wherein the load ring is uncompressed.

7. The seal assembly of claim 1, wherein the load ring includes a relief surface extending between the radial segment of the first member engagement surface and the axial segment of the seal ring engagement surface.

8. The seal assembly of claim 7, wherein the relief surface includes an inclined segment which is disposed at an oblique angle with respect to the rotational axis when the load ring is in an uninstalled state, wherein the load ring is uncompressed.

9. The seal assembly of claim 8, wherein the inclined segment of the relief surface is at an angle, with respect to the axial segment of the seal ring engagement surface, in a range from about twenty degrees to about sixty degrees when the load ring is in an uninstalled state, wherein the load ring is uncompressed.

10. The seal assembly of claim 8, wherein the relief surface includes a reverse curve portion adjacent the axial segment of the seal ring engagement surface, and the inclined segment of the relief surface is adjacent the radial segment of the first member engagement surface.

11. The seal assembly of claim 10, wherein the reverse curve portion of the relief surface includes a concave segment, a transition segment, and a convex segment, the concave segment disposed adjacent the inclined segment of the relief surface, the convex segment disposed adjacent the axial segment of the seal ring engagement surface, and the transition segment disposed between the concave segment and the convex segment.

12. The seal assembly of claim 1, wherein the axial segment of the seal ring engagement surface has an axial length, measured along the rotational axis, equal to at least seventy-five percent of the axial length of the axial segment of the first member engagement surface when the load ring is in an uninstalled state, wherein the load ring is uncompressed.

13. A track pin joint assembly comprising:
a pin defining a longitudinal axis;
a first member and a second member both coaxial with the pin about the longitudinal axis, the first member being pivotable about the longitudinal axis with respect to the second member, the first member including an end and a load ring engagement surface defining, at least in part, an axially-extending seal cavity disposed in proximal relationship to the second member; and
a seal assembly, the seal assembly comprising:
a seal ring, the seal ring having an axial flange, extending parallel to the longitudinal axis, and a radial flange, extending along a radial axis perpendicular to the longitudinal axis; and
a load ring, the load ring including a main body comprising a seal ring engagement surface and a first member engagement surface, and a neck extending outwardly from the main body along a neck axis;
the seal ring engagement surface including a radial segment in proximate relationship with the radial flange of the seal ring and an axial segment in proximate relationship with the axial flange of the seal ring,
the first member engagement surface engaging the load ring engagement surface of the first member, the first member engagement surface including a radial segment and an axial segment, the radial segment of the first member engagement surface being in distal relationship with the radial segment of the seal ring engagement surface, and
the neck axis disposed at an angle with respect to the axial segment of the seal ring engagement surface, and passing between the axial segment of the first member engagement surface and the radial segment of the seal ring engagement surface;
wherein when the load ring is in an uninstalled state, such that the load ring is uncompressed:
the axial segment of the seal ring engagement surface of the load ring extends over at least half the length, measured along the longitudinal axis, between the radial segment of the seal ring engagement surface and the radial segment of the first member engagement surface; and
wherein at least one of: the load ring engagement surface of the first member, and the axial segment of the first member engagement surface of the load ring includes a convex rounded portion extending over at least half the axial length thereof.

14. The track pin joint assembly of claim 13, wherein the first member includes an annular base surface extending substantially radially about the longitudinal axis, the base surface cooperating with the load ring engagement surface to define the seal cavity, the load ring engagement surface extending between the end of the first member and the base surface, and the load ring engagement surface of the first member includes the convex rounded portion, the convex rounded portion extending over at least half the axial length of the load ring engagement surface measured along the longitudinal axis between the end and the base surface of the first member.

15. The track pin joint assembly of claim 14, wherein the convex rounded portion of the load ring engagement surface of the first member has a cross-sectional shape with a radius in a range from about one-quarter to about eight times the axial length of the load ring engagement surface.

16. The track pin joint assembly of claim 13, wherein the axial segment of the first member engagement surface of the load ring includes the convex rounded portion, and the convex rounded portion has a cross-sectional shape with a radius in a range from about one to about six times the length, measured along the longitudinal axis, of the axial segment of the first member engagement surface, when the load ring is in an uninstalled state, wherein the load ring is uncompressed.

17. The track pin joint assembly of claim 13, wherein the neck axis is disposed at a first angle with respect to the axial segment of the seal ring engagement surface in the uninstalled state, and at a second angle with respect to the axial segment of the seal ring engagement surface in an installed state, wherein the load ring is compressed between the first member and the seal ring, and wherein the first angle is different than the second angle.

18. The track pin joint assembly of claim 17, wherein the difference between the first angle and the second angle is in a range from about three degrees to about sixty degrees.

* * * * *